(12) United States Patent
O'Connell (10) Patent No.: US 9,207,786 B2
(45) Date of Patent: Dec. 8, 2015

(54) MOUSE HOUSE

(71) Applicant: Craig D. O'Connell, Branford, CT (US)

(72) Inventor: Craig D. O'Connell, Branford, CT (US)

( * ) Notice: Subject to any disclaimer, the term of this patent is extended or adjusted under 35 U.S.C. 154(b) by 0 days.

(21) Appl. No.: 14/376,635

(22) PCT Filed: Feb. 6, 2013

(86) PCT No.: PCT/US2013/024836
§ 371 (c)(1),
(2) Date: Aug. 5, 2014

(87) PCT Pub. No.: WO2013/119601
PCT Pub. Date: Aug. 15, 2013

(65) Prior Publication Data
US 2015/0007417 A1   Jan. 8, 2015

Related U.S. Application Data

(60) Provisional application No. 61/595,718, filed on Feb. 7, 2012.

(51) Int. Cl.
*B68G 5/00*    (2006.01)
*G06F 3/039*   (2013.01)
*B25G 1/10*    (2006.01)

(52) U.S. Cl.
CPC ............... *G06F 3/039* (2013.01); *B25G 1/102* (2013.01); *G06F 3/0395* (2013.01); *Y10T 16/476* (2015.01)

(58) Field of Classification Search
CPC ....... G06F 3/039; G06F 3/0395; B25G 1/102; Y10T 16/476
USPC ....................................................... 248/118
See application file for complete search history.

(56) References Cited

U.S. PATENT DOCUMENTS

| 4,089,497 A * | 5/1978 | Miller ................. A47B 95/043 248/118 |
| 5,340,067 A | 8/1994 | Martin et al. |
| 6,193,196 B1 | 2/2001 | Hesley |
| 6,431,504 B1 * | 8/2002 | Ignagni ............... G06F 3/03543 248/118 |
| 6,585,198 B2 | 7/2003 | Dillon |
| 6,590,564 B1 | 7/2003 | McLoone et al. |
| 6,616,108 B1 | 9/2003 | Brophy et al. |
| 7,385,587 B1 | 6/2008 | Adapathya et al. |

(Continued)

FOREIGN PATENT DOCUMENTS

KR   2007-0109135   * 10/2007

OTHER PUBLICATIONS

The Palm Rest, The Only Way to Drive, http://web.archive.org/web/20091208105811/http://thepalmrest.com/, Dec. 8, 2009.

(Continued)

*Primary Examiner* — Christopher Garft
(74) *Attorney, Agent, or Firm* — Mark Nowotarski (57) ABSTRACT

A mouse house comprises a foam material for surrounding a computer mouse and providing a platform for a user's hand to rest on. The mouse house is wide enough to support all of a person's fingers in a neutral hand position and has side walls to prevent the mouse from tipping laterally. Viscoelastic foam may be used for the top surface for user comfort. The leading edge of the mouse house is set back from the operating keys of the mouse. The mouse house may have a bottom cavity with side fingers for securely gripping a wide variety of computer mice placed therein.

8 Claims, 8 Drawing Sheets

(56) References Cited

U.S. PATENT DOCUMENTS

| | | | |
|---|---|---|---|
| 7,705,827 B1 | 4/2010 | Robinson | |
| 7,997,544 B2 | 8/2011 | Fong | |
| 2003/0090464 A1 | 5/2003 | Lai et al. | |
| 2004/0255713 A1 | 12/2004 | Wilson | |
| 2005/0085372 A1* | 4/2005 | Spradling | C01B 31/00 501/99 |
| 2005/0174330 A1* | 8/2005 | Varga | G06F 3/03543 345/163 |
| 2005/0200604 A1 | 9/2005 | Norman | |
| 2005/0275621 A1 | 12/2005 | Saez et al. | |
| 2006/0152490 A1 | 7/2006 | Ho et al. | |
| 2007/0152110 A1 | 7/2007 | Fong | |
| 2007/0234595 A1* | 10/2007 | Davis | A43B 3/26 36/94 |
| 2007/0242046 A1* | 10/2007 | Weiss | G06F 3/03543 345/163 |
| 2008/0139433 A1* | 6/2008 | Mock | C08J 9/405 510/158 |
| 2008/0178390 A1* | 7/2008 | DuDonis | A47C 20/021 5/632 |
| 2008/0196971 A1* | 8/2008 | Charbonnier | G10K 11/168 181/290 |
| 2008/0290141 A1* | 11/2008 | Shaw | B23K 1/0008 228/155 |
| 2010/0190622 A1* | 7/2010 | Johnson | A61H 1/024 482/136 |

OTHER PUBLICATIONS

International Search Report PCT/US 2013/024836, Apr. 11, 2013
Compare Memory Foam to Regular Foam, Top Findings In A Memory Foam Comparison, Jun. 11, 2010.

* cited by examiner

MOUSE HOUSE

CROSS-REFERENCE TO RELATED APPLICATION

This application claims the benefit of U.S. provisional patent application 61/595,718, "Mouse House", filed Feb. 7, 2012. Said application is incorporated in its entirety herein by reference.

FIELD OF INVENTION

The inventions described herein are in the field of ergonomic computer mice.

BACKGROUND

Figure 1:
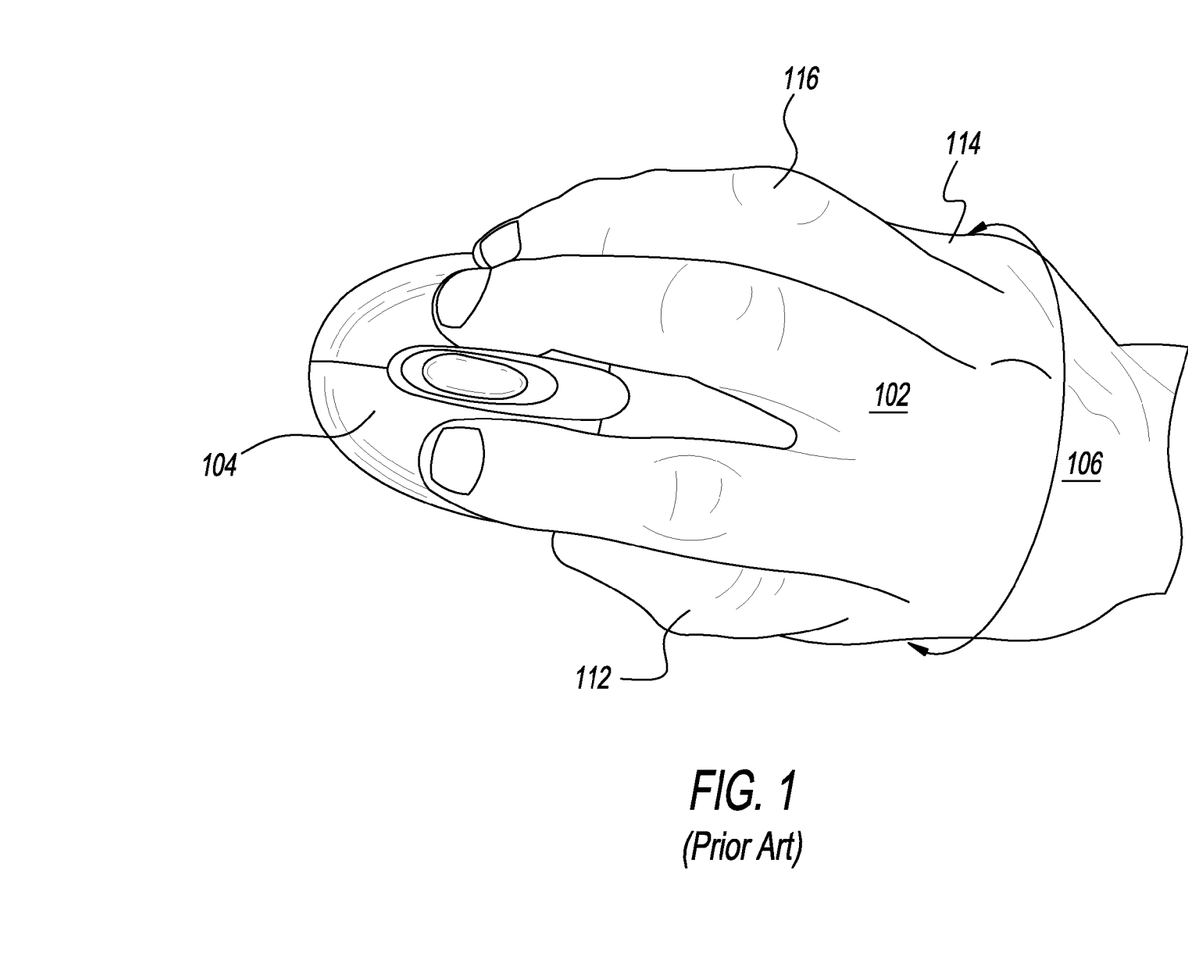
FIG. 1 is a top view of a user's hand operating a conventional computer mouse

Computer mice are hand operated devices for inputting a hand position into a computer. The hand position is often represented on a computer screen as an icon position. Computer mice generally have a relatively narrow width of about 6.35 cm. Thus a user's hand will normally have a domed shape when it is placed over the mouse to grip it. This is illustrated in FIG. 1. A user's thumb 112 will grip one side of the mouse 104 and the user's pinky 114 and perhaps ring finger 116 will grip the other side of the mouse. This constant gripping 106 can lead to stress 102 in the muscles, tendons and ligaments of a user's hand when the mouse is used for prolonged periods of time. Prolonged and repetitive stress can lead to pain, swelling, and possible nerve damage.

Figure 2A:
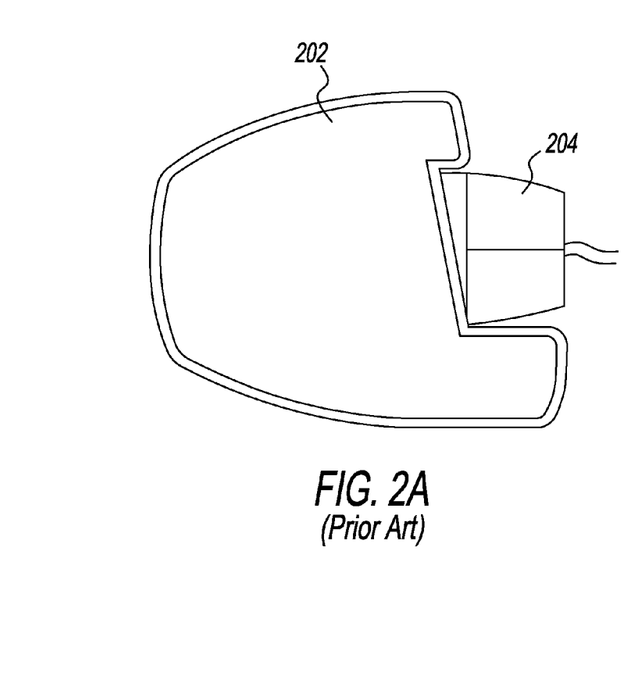
FIG. 2A is a prior art platform for attaching to a computer mouse.
Figure 2B:
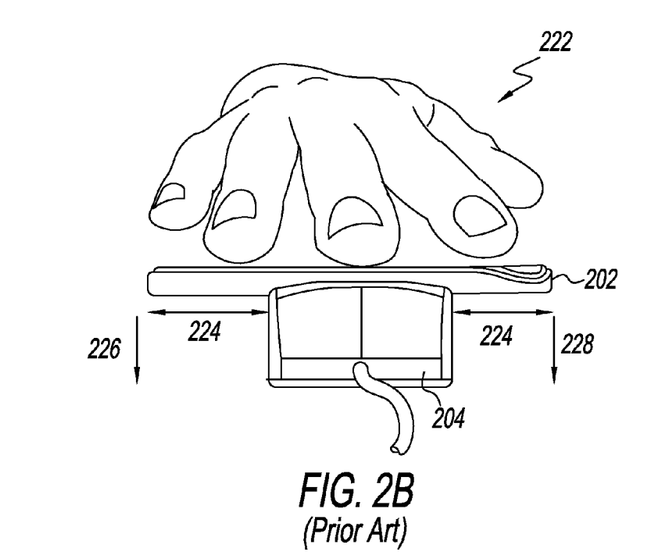
FIG. 2B is a front view of the platform of FIG. 2A.
Figure 2C:
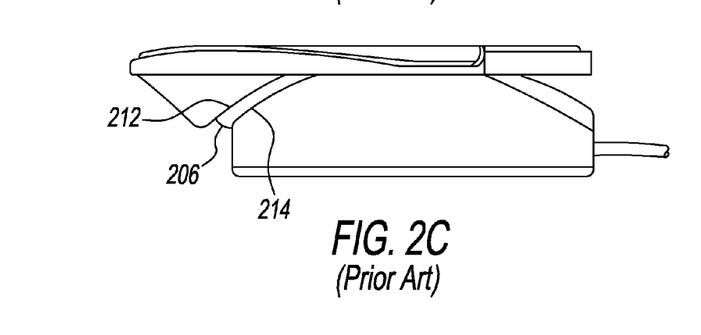
FIG. 2C is a side view of the platform of FIG. 2A.

FIGS. 2A, 2B, and 2C are a top view, front view and side view respectively of an attempted solution to the gripping hand problem. The instant FIG. 2A corresponds to FIG. 1 of U.S. Pat. No. 6,431,504, "Attachable Contoured Computer Mouse Rest" (Ignagni). The instant FIG. 2B corresponds to FIG. 4 of Ignagni and the instant FIG. 2C corresponds to FIG. 2 of Ignagni. Ignagni attempts to address the problem of gripping hand by providing a contoured extension platform 202 for a user to rest his/her hand upon when using a mouse 204. Users of the Ignagni platform, however, must still "grip" the mouse due to the need to stabilize it laterally. This is illustrated in FIG. 2B. When a user places his/her hand 222 on top of the platform, imbalanced forces on the platform extensions 224 can cause the mouse to tip. If the mouse tips to the left 226 then the user must use muscle control to counterbalance the platform to the right 228 and vice versa. This is a form of gripping. The constant need to balance the Ignagni platform can lead to repetitive stress in the muscles ligaments and tendons of the hand and forearm of the user.

The Ignagni platform is also difficult to retrofit on alternative common mouse designs. Referring to FIG. 2C, the contoured extension platform is attached to the top of a computer mouse using adhesive 206. The fixed central curvature of the underside of the platform 212 must match up with the top side curved surface 214 of the mouse. Since different mice designs have different upper surface curvatures, no single Ignagni platform design will be generally applicable to all mouse designs. Each mouse design will have to have its own platform design.

There is need, therefore, for a hand rest for a computer mouse that minimizes gripping of said computer mouse even when a user's hand is in a relatively flat configuration and is adaptable to a wide variety of different mouse upper surface curvatures.

SUMMARY OF THE INVENTION

The Summary of the Invention is provided as a guide to understanding the invention. It does not necessarily describe the most generic embodiment of the invention or all species of the invention disclosed herein.

A mouse house, according to the present disclosure, is a device that can be placed on a wide variety of computer mice and provide a relatively flat surface for a user's hand so that the hand does not form a stressful domed shape. A mouse house can be made of a foam material, such as memory (e.g. visco-elastic) foam. It has a top flat surface large enough to support a user's hand and non-operational fingers (thumb, pinky, ring finger). It has a leading edge placed back of a mouse's keys so that the operational fingers (pointer and index fingers) may use the keys. It has a bottom cavity with a highly deformable surface that will fit over and grip the top surface curvatures of most popular computer mice. It has a side wall so that the user's hand does not have to stabilize the mouse house laterally.

DETAILED DESCRIPTION

The following detailed description discloses various embodiments and features of the invention. These embodiments and features are meant to be exemplary and not limiting. As used herein, the term "about" and its synonyms mean plus or minus 10% of a given value unless specifically indicated otherwise.

Figure 3:
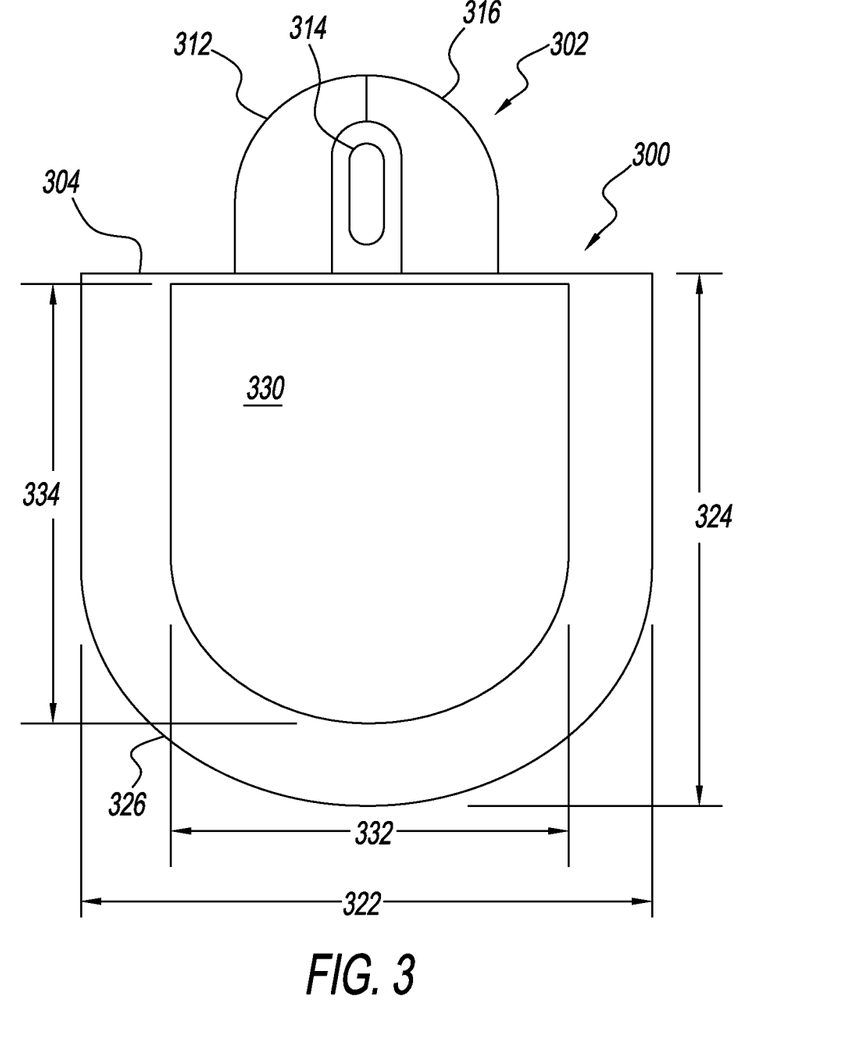
FIG. 3 is a top view of an embodiment of a mouse house.

FIG. 3 is a top view of a mouse house 300 installed over a computer mouse 302. The mouse house has a top planar area 330 and a leading edge 304. The planar area is about the size of the palm of an adult person's hand.

Smaller sizes can be provided for children. A suitable width 332 of the planar area is about 7.62 cm. A suitable length 334 of the planar area is about 7.94 cm. The top surface of the mouse house rounds off outside of the planar area. Thus when a user's hand rests on the mouse house, the edges of the hand will have a surface to push against to move the mouse horizontally. The total width 322 of the mouse house is about 10.16 cm and the total length 324 is about 10.48 cm. The back edge 326 of the mouse house may have a curved shape.

When the mouse house is placed on a mouse, the leading edge is set back from the front of the mouse so that the operating keys 312, 316 and scroll wheel 314 are free to be selected by a user's operational fingers. The same would be true if the mouse did not have a scroll wheel or only one operating key. The mouse house may wrap around the side of the mouse as long as the operating keys are exposed.

Figure 4:
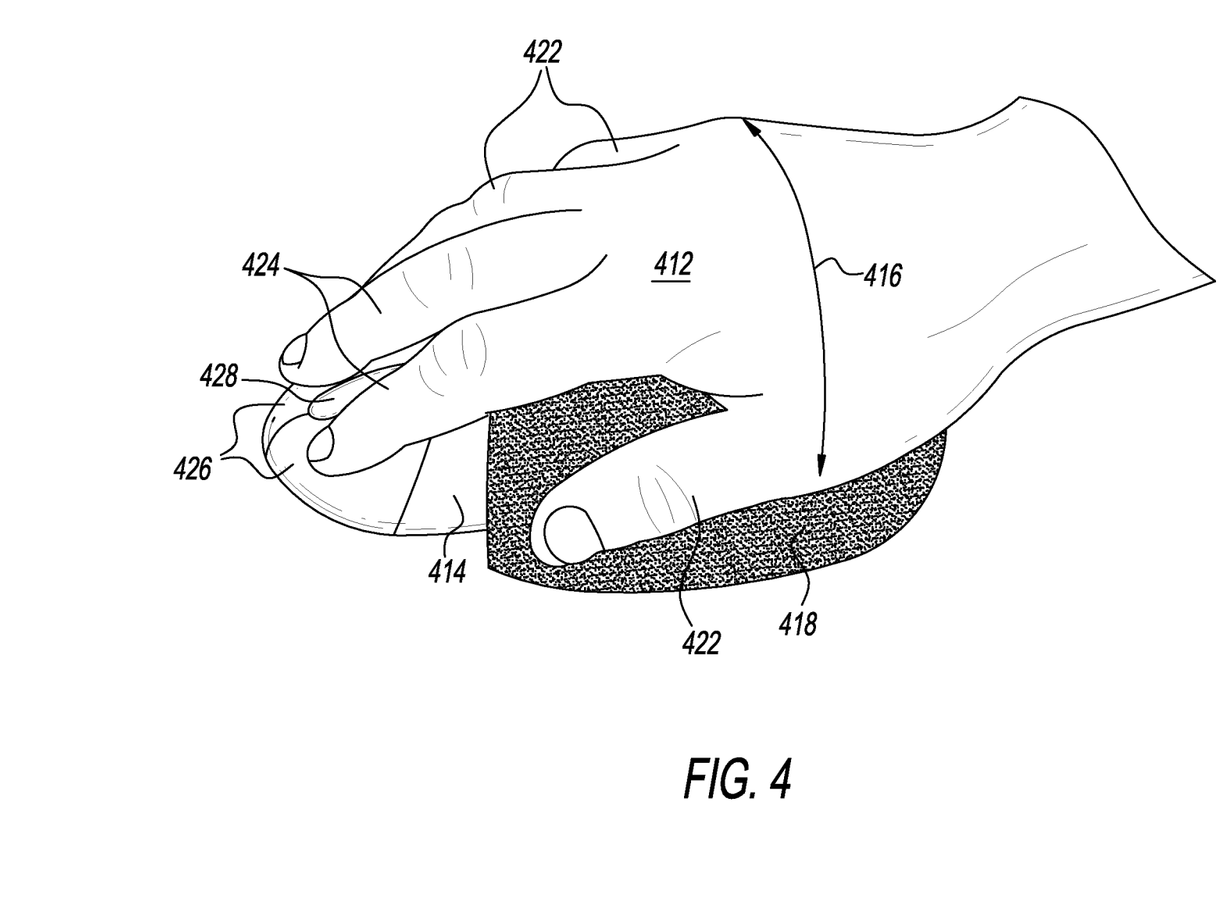
FIG. 4 is a perspective illustration of a user's hand operating the mouse house of FIG. 3.

FIG. 4 illustrates the use of the mouse house. A person places his/her hand 412 on top of the mouse house 418 and moves the mouse 414 around. The hand as a whole is in an open and neutral configuration 416. The nonoperational fingers 422 rest in a neutral position. The operational fingers 424 are also in a neutral position but can select the operating keys 426 or scroll wheel 428 as needed. An example of a neutral hand position is the shape the hand normally takes where a person is standing and lets his or her arm fall naturally to their side.

Figure 5:
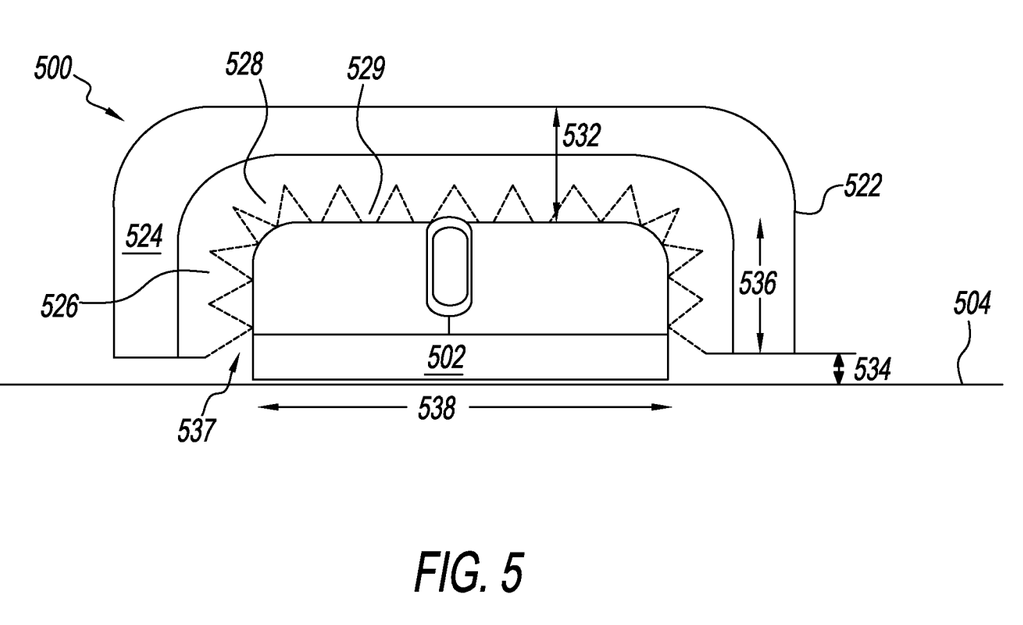
FIG. 5 is a front view of the mouse house of FIG. 3.

FIG. 5 is a front view of a mouse house 500 installed on a computer mouse 502. The mouse house comprises side walls 522 which extend down towards the surface 504 that the mouse is resting on. The length of the side walls is selected such that there is a small clearance 534 between the bottom of the side walls and said surface. A suitable clearance is about 0.32 cm. This allows the mouse to move freely over said surface. Larger gaps may be used provided the side walls are close enough to the surface to provide lateral stability.

The mouse house comprises a relatively firm outer layer 524 and a relatively soft inner layer 526. The outer layer provides support for a person's hand resting on the mouse house. Suitable materials for the outer layer include regular foam, memory foam or other material that is dense enough so that it will hold its overall bulk shape under the weight of a person's hand but soft enough so that its surface will conform to the contours of said hand being placed on it. Memory foam allows the foam to take the shape of the person's hand under the weight of said person's hand. Hence it is very comfortable. Suitable foam densities are in the range of about 0.048 to about 0.096 gm/cc.

The inner layer 526 is soft enough to conform to the shape of a mouse. The layer may comprise fingers or other projections 528. These help the inner layer conform 529 to a wide variety of mouse shapes. The inner layer should not slip relative to the mouse in normal use. Suitable material for the inner layer can be low density regular foam, low density visco-elastic foam, or other material that will readily conform to different mouse shapes when the mouse house is placed over said shapes.

The inner layer forms a cavity 537 that the mouse resides in. The cavity has a width 538 that is suitable for most mouse designs. 5.72 cm to 6.35 cm is a suitable range of widths for the cavity. The height 536 of the cavity should be selected so that the upper surface of the mouse house is a suitable elevation 532 above the operating keys of the mouse. A suitable elevation for the upper surface of the mouse house above the operating keys of the mouse is about 1.91 cm. A suitable height of the cavity for most current mouse designs, therefore, is about 1.91 cm.

A suitable thickness for the outer layer is about 1.27 cm. A suitable thickness for the inner layer is about 0.64 cm. The relative dimensions of the inner and outer layer can be varied as long as the overall thickness is in a desired range. An overall thickness of 1.91 cm is suitable for average users. Smaller overall thicknesses would be suitable for users with smaller hands, such as children or women. Larger overall thicknesses may be suitable for users with larger hands, such as adult men or teenage men.

The mouse house may also be provided as a standard part of a computer mouse. The mouse house might then be molded to conform with the harder body of the mouse and may be attached, such as by gluing. A softer inner layer, therefore, would no longer be necessary.

Alternative Embodiments

Figure 6:
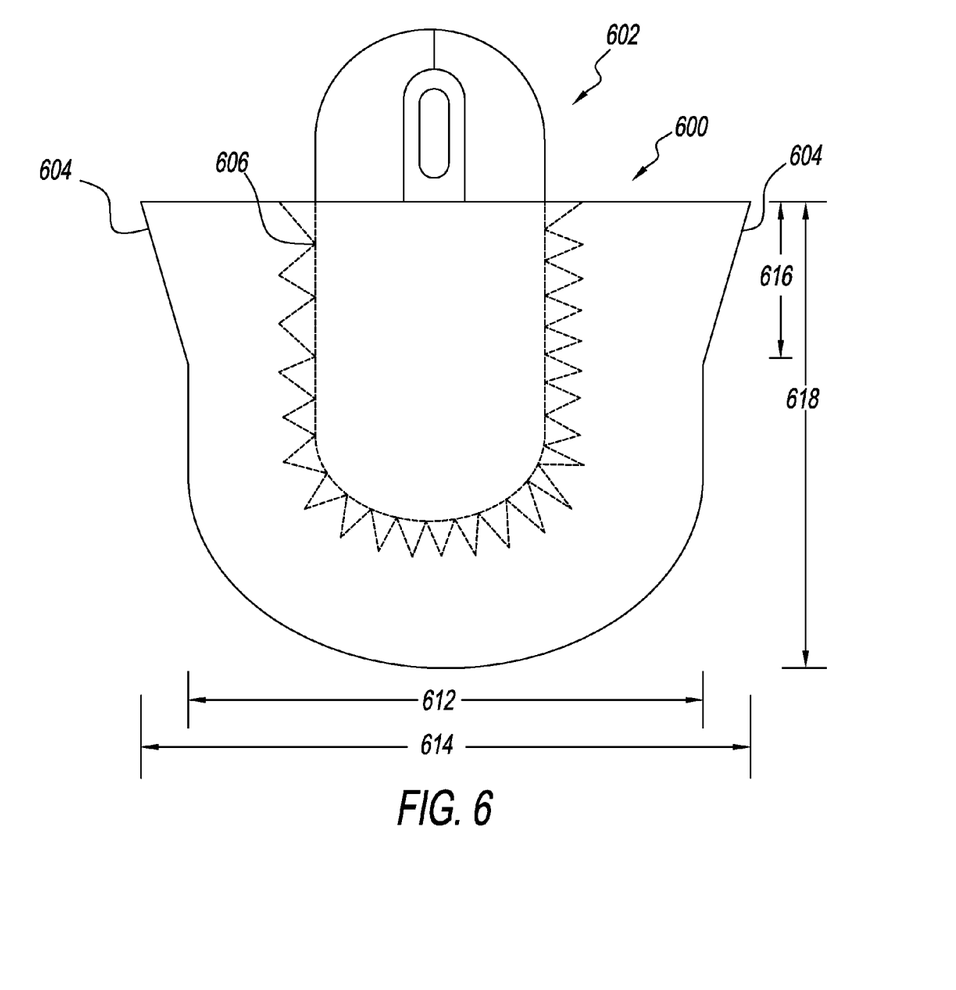
FIG. 6 is a top view of a flared mouse house.

FIG. 6 illustrates a top view of an alternative embodiment of a mouse house called a flared mouse house. The flared mouse house 600 is mounted on a mouse 602. Side fingers 606 within the cavity conform to the shape of the mouse and grip it. The cavity may have a width of about 6.35 cm, and a length of about 8.26 cm. The side fingers may each have a length of 0.64 cm and a width of 0.64 cm. The top of the mouse house is flared 604 on each side. The length 616 of the flares may be about 5.08 cm. The total length of the mouse house 618 may be about 12.70 cm. The total width 614 of the flared end may be about 12.70 cm. The total width 612 of the back end may be about 10.16 cm. Thus the back end is narrower than the back end of the straight sided mouse house illustrated in FIG. 3. This will allow the back of the user's hand to contact the side of the mouse house and help move it around.

Figure 7:
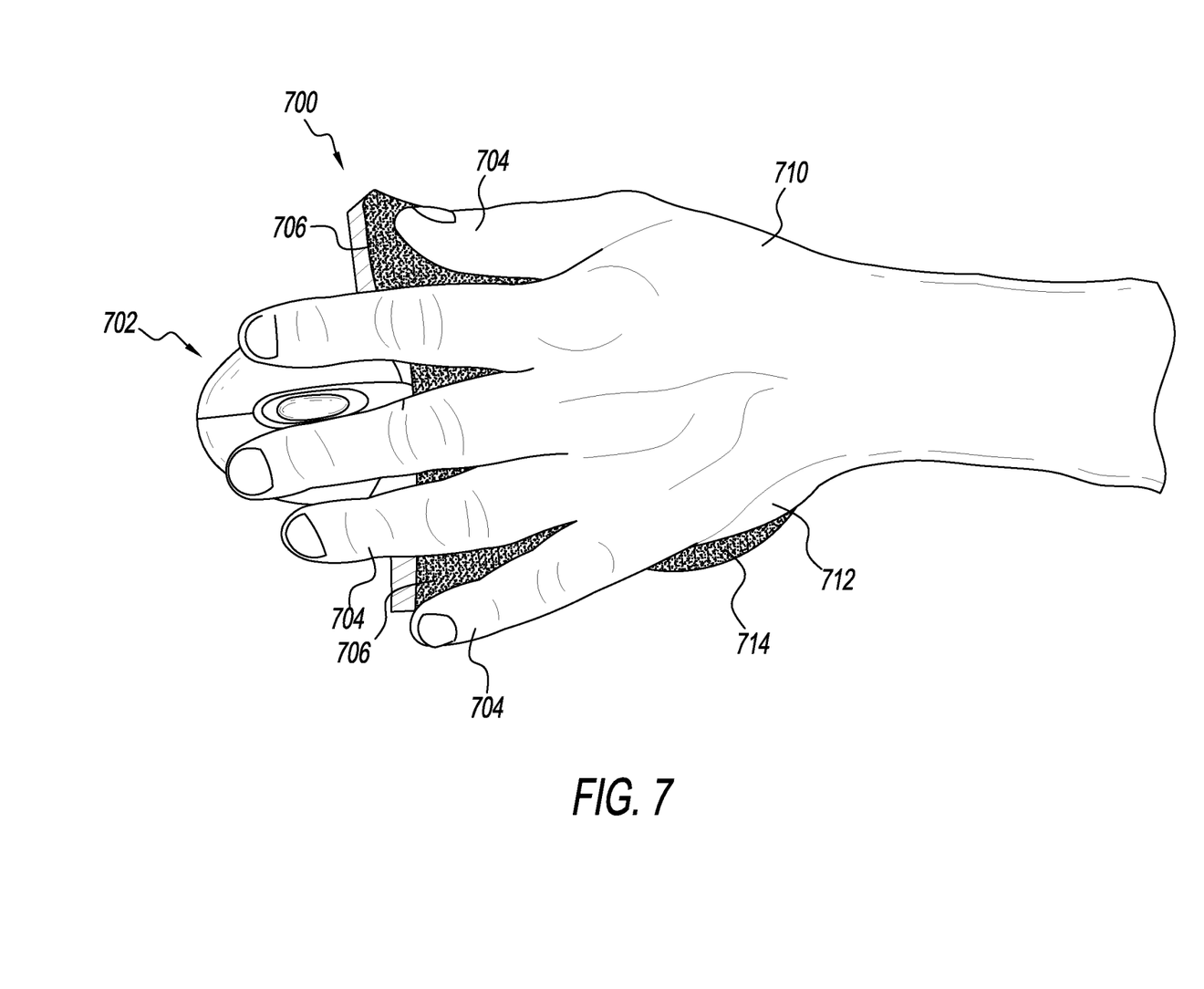
FIG. 7 is a top view of a user's hand using the flared mouse house embodiment of FIG. 6.

FIG. 7 is a top view of a flared mouse house that illustrates its use. A flared mouse house 700 is placed on a mouse 702. A user's hand 710 is placed on the flared mouse house. The non-operating fingers 704 rest on the flares 706 in neutral positions. The back of the user's hand 712 closely matches the back 714 of the mouse house and may slightly overhang it. Thus the mouse house will be responsive to the user's hand movements.

Figure 8:
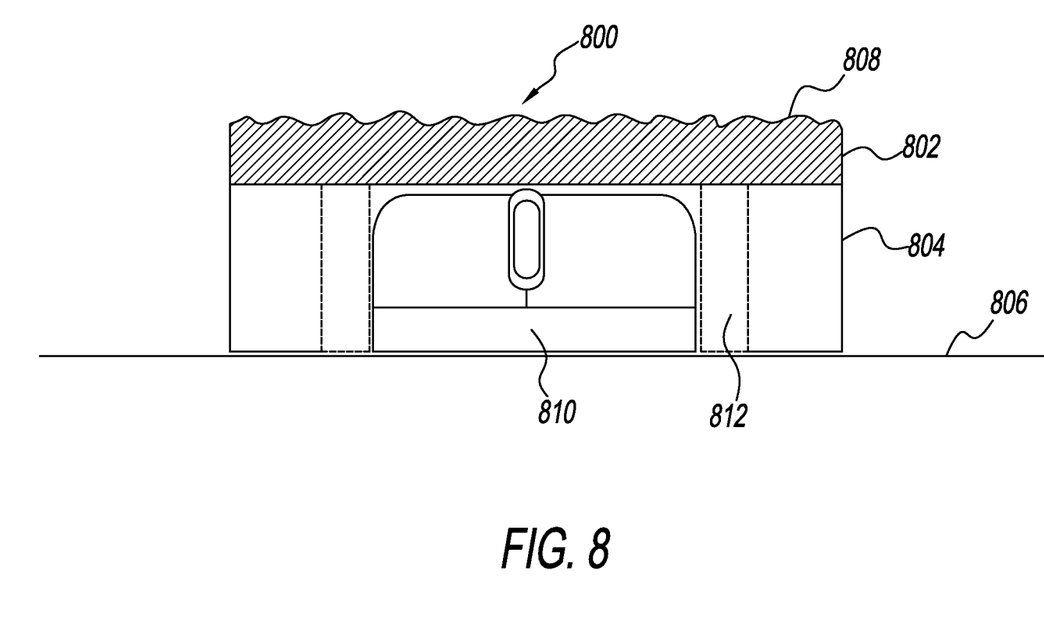
FIG. 8 is a front view of a layered mouse house.

FIG. 8 is a front view of an alternative embodiment of a mouse house called a layered mouse house. The layered mouse house 800 is placed on a mouse 810. The layered mouse house comprises a top layer 802 and a bottom layer 804. The top layer is made from a foam material designed to properly interface with user's hand. The foam material may be memory foam with an optionally rippled top surface 808. The thickness may be about 1.27 cm. This provides greater comfort to the user's hand. The bottom layer may be made of relatively stiff foam that will have low friction with a resting surface. The thickness may be about 2.54 cm. Thus the layered mouse house will have reduced friction with the resting surface 806 if the bottom layer contacts it. The bottom layer may comprise side fingers 812 that conform to the shape of the mouse. An example of these side fingers is illustrated as item 606 in FIG. 6.

The top and bottom layer in a layered mouse house may be bonded by conventional means, such as gluing, taping, heat bonding, etc. If a roller glue process is used, then minimal glue will extrude from the side of the layers when they are bonded together and the side of the mouse house will be comfortable to a user's hand. This was verified by experiment.

A layered mouse house has the surprising advantage of reduced "re-gripping" when a person initially uses it. If a mouse house is made entirely of memory foam, then once a person puts his/her hand on it, it will slowly conform to the mouse shape underneath it. The person will then have to re-grip the mouse house as it settles in. If the bottom layer is conventional foam and the top layer is memory foam, then the shape of the conventional foam gripping the mouse will remain the stable as a person puts his/her hand on the mouse house. The top layer of memory foam will conform to the person's hand shape, but no re-gripping will be needed. This was verified by experiment.

Various features of the exemplary mouse houses described herein may be combined to provide additional alternative embodiments. The layered mouse house, for example, may have a top cross section similar to the basic mouse house of FIG. 3, the flared mouse house of FIG. 6, or any other appropriate shape. Similarly, the rippled top surface may be used on any of the embodiments described herein.

Example 1

A woman about 50 years of age experienced severe right thumb hand pain after use of a conventional mouse for an extended period of time. The woman was a computer operator and used a conventional computer mouse with her right hand for 8 hours a day, 5 days a week for several years. The woman was diagnosed by an orthopedic surgeon as having tendonitis and received cortisone injections. The injections were not effective at relieving her pain.

Upon the advice of her chiropractor, the woman installed a mouse house over her computer mouse. The mouse house was similar in design to the mouse house illustrated in FIG. 3. The mouse house was made of a single regular foam material. The inner cavity was carved to conform to the shape of the particular mouse the woman used.

The woman experienced reduced pain immediately when she first used the mouse house. After three weeks of use, the woman experienced no pain at all.

Example 2

A mouse house was built with a firm outer layer and soft inner layer as illustrated in FIG. 5. The inner layer comprised teeth as illustrated in FIG. 5. The foam of the inner layer and outer layer was viscoelastic. The mouse house was installed on the brands and models of computer mice shown in Table 1. The mouse house fit all brands. All of the mice could be used and had a stable top surface of the mouse house.

TABLE 1

Computer mice compatible with Mouse House

| Vendor | Type | Model |
|---|---|---|
| Microsoft | Touch mouse | 3KJ-00001 |
|  |  | MGC-00001 5000 |
|  |  | MHC-00001 6000 |
|  | Wireless mouse 3500 | GMF-00030 |
|  |  | 69R -V0001 note book mouse |
|  | Wireless mouse 1000 | 2CF-00002 |
|  | Wireless mouse 2000 | 36D-00001 |
|  | Wireless mouse 5000 | MGC00001 |
|  | Wireless mouse 6000 | MHC-00001 |
|  | Basic optical mouse | P 58-00032 |
|  |  | P 58-00001 |
|  | Comfort mouse 4500 | 4FD-00006 |
|  | Comfort mouse 3000 | 59J-00001 |
|  | Intelmouse explorer | B75-00113 |
| HP | Wireless mouse | WE791AA#ASA |
|  |  | M-LK006AA#ABA |
|  |  | MLR919AA#ABC |
|  | Mobile mouse | M-LH571AA#ABA |
| Dell |  | K095T |
|  |  | K096T |
|  |  | K097T |
| Logitech | M110 | 910-001600 |
|  | M50 corded | 910-001204 |
|  | Anywhere mouse | 910-000812 |
|  | Mouse for android | 910-002626 |
|  | Cordless optimal trackman | 904-369-0403 |
|  | Wireless MM225 | 910-002538 |
|  | Gaming mouse G300 | 910-002358 |
| Apple | Mighty mouse |  |
| Office Max | Engage wireless optical mouse w/nano |  |
|  | Wired optical mouse |  |
|  | Fellowes wired 5 button optical mouse | 98913 |
|  | Targus USB retractable optical laptop | AMU89US |
| Staples | Microsoft comfort mouse 6000 | S7J-00001 |
|  | Microsoft express mouse |  |
| Wal-Mart | Toshiba nano wireless mouse | PA37454-ETZ |
|  | Gear Head wireless mouse | MP2475PLE |
|  | File Mate wireless optical mouse M2825 | 3FMNM2825 WTL-R |
|  | File Mate wireless optical mouse M1030 | 3FMNM1030 WBK-R |
|  | Razer naga laser | RZ01-00280100-R341 |

Example 3

A flared and layered mouse house was built according to FIGS. 6 and 8. The top layer was viscoelastic foam. The bottom layer was regular foam. The top and bottom layers were each formed by a vertical cut. The two layers were joined by a hot-melt glue.

The flared and layered mouse house was placed over a computer mouse as shown in FIG. 7. The operator's hand was very comfortable. The shape of the top layer conformed to the shape of the user's palm under the weight of the user's hand. The bottom layer of regular foam maintained a constant shape under the weight of the person's hand. No regripping, therefore, was required.

CONCLUSION

Whereas various particular embodiments of the present invention have been described with respect to different applications, a person of ordinary skill in the art will appreciate how various elements of the different embodiments can be applied to a variety of applications in accordance with the requirements of said applications.

We claim:

1. A mouse house system comprising:
    a) a top viscoelastic foam layer comprising a top surface, a bottom surface, a leading edge, a back end opposite said leading edge, a left side flare and a right side flare; and
    b) a bottom foam layer describing a horizontal cavity comprising an open end, said bottom layer comprising a top surface, a bottom surface, a leading edge at about said open end of said cavity, a back end opposite of said leading edge of said bottom layer, and a plurality of foam side fingers forming alternate projections and recesses defining said cavity wherein:
    c) said left side flare and said right side flare increase a width of said top layer from said back end of said top layer to said leading edge of said top layer;
    d) said top layer is bonded to said bottom layer forming a cover over at least a portion of said cavity; and
    e) said leading edge of said top layer is oriented in the same direction as said leading edge of said bottom layer.

2. The mouse house system of claim 1 wherein:
    a) said top layer has a height in the range of about 1.27 cm to about 1.91 cm, a width in a range of about 10.16 cm to about 12.70 cm, and a length in the range of about 10.48 cm to about 12.70 cm; and
    b) said cavity has a width in the range of about 5.72 cm to about 6.35 cm, a length of about 8.26 cm, and a height in the range of about 1.91 cm to about 2.54 cm.

3. The mouse house system of claim 1 wherein said bottom surface of said top layer is flat.

4. The mouse house system of claim 1 wherein said back end of said top layer is curved.

5. The mouse house system of claim 1 wherein said bottom layer has a uniform horizontal cross section from said top surface of said bottom layer to said bottom surface of said bottom layer.

6. The mouse house system of claim 5 wherein said projections extend from said recesses by about 0.64 cm.

7. The mouse house system of claim 1 which further comprises a computer mouse and wherein:
    a) said computer mouse comprises a front end, a back end, a left side, a right side and one or more operating keys located at said front end of said computer mouse;

b) said back end of said computer mouse is contained within said cavity;
c) at least a portion of said operating keys are outside of said cavity and in front of said leading edge of said top layer; and
d) said side fingers conform to the shape of said mouse and grip said computer mouse.

8. The mouse house system of claim 1 wherein said side fingers form a horizontal saw tooth pattern.

\* \* \* \* \*